United States Patent [19]

Elks

[11] Patent Number: 4,460,889
[45] Date of Patent: Jul. 17, 1984

[54] PROXIMITY ALARM

[76] Inventor: William J. Elks, 1310 Cary Way, San Diego, Calif. 92109

[21] Appl. No.: 401,663

[22] Filed: Jul. 26, 1982

Related U.S. Application Data

[63] Continuation-in-part of Ser. No. 254,825, Apr. 16, 1981, Pat. No. 4,390,862.

[51] Int. Cl.³ ............................................. B60Q 1/00
[52] U.S. Cl. .................................. 340/61; 200/61.44; 200/DIG. 10
[58] Field of Search ....... 340/61; 200/61.44, DIG. 10

[56] References Cited

U.S. PATENT DOCUMENTS

| | | | |
|---|---|---|---|
| 2,520,305 | 8/1950 | Campbell | 340/61 X |
| 2,812,397 | 11/1957 | Taylor | 200/61.44 |
| 2,930,862 | 3/1960 | Samaniego | 340/61 X |

Primary Examiner—David L. Trafton
Attorney, Agent, or Firm—Ralph S. Branscomb

[57] ABSTRACT

A simplified proximity alarm of the type used on motor vehicles to sense the curb, low overpasses, etc. utilizes an extended feeler probe which passes through a loop contact such that when the two meet an audio or visual alarm signalling device within the cab of the vehicle is actuated. Special means mounting the probe are provided whereby a tangential set screw doubles as a means of retaining the probe within the mounting plug under a pre-determined tension, and also the screw acts as a terminal for connection into the alarm circuit. Moisture and fume protection is provided in one embodiment, and the probe and probe tip are so designed to avoid destruction of the entire unit should the probe become snagged.

3 Claims, 9 Drawing Figures

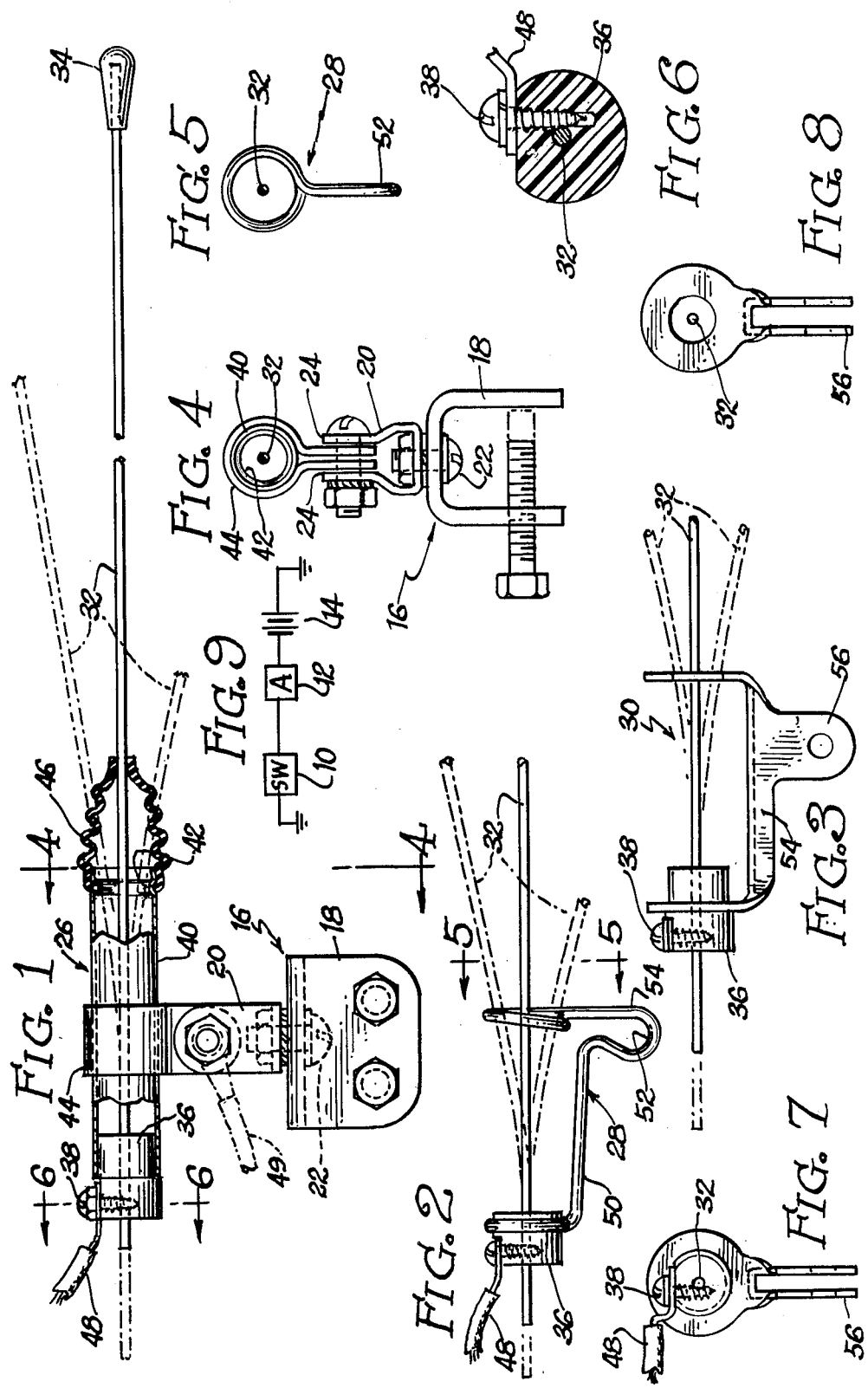

PROXIMITY ALARM

The invention is a continuation-in-part of application Ser. No. 254,825 filed Apr. 16, 1981 now U.S. Pat. No. 4,390,862.

BACKGROUND OF THE INVENTION

The invention is in the field of proximity alarms, and in particular relates to a simple device which can be easily clamped onto a vehicle to sense the curb or other structure, and coupled into the electrical circuit of the vehicle so that an electrical alarm on the dashboard or other convenient place is actuated upon the sensor switch being triggered.

Curb feelers have traditionally been of the non-electrical kind in which the noise of the probe scraping a curb was intended to alert the driver that he was close enough to the curb. This type of feeler may have been adequate thirty years ago, but with today's vehicles, many of which are either being air-conditioned or heated and have the windows rolled up, possibly with the stereo playing, the mechanical scraping of a probe against the curb is a very unreliable means of alerting the driver of his position. However, there has not been widespread use of such a feeler with an internal alarm, possibly because the mechanical scraper is so cheap and simple compared to electrical design systems which may have been developed heretofore, including those illustrated in the patents cited in the parent application to this case.

Up to date design criteria dictate that in addition to the unit being as durable and fail-safe as possible, a major thrust in the design must be directed toward elimination of all possible surplus cost factors. Prior units as well as the unit disclosed in the parent application were not reduced to the lowest possible cost of construction coupled with durability and protection for the unit in use.

SUMMARY OF THE INVENTION

The present invention however does fulfill those above-stated design criteria of durability, protection for the unit in use by virtue of its design, and elemental simplicity of design to reduce the cost of production to a bare minimum.

The device consists of an electrical circuit, a dashboard light or the equivalent, and the sensor switch itself. The sensor switch is of the probe and ring variety and utilizes a support which defines the outer ring at one end, and at the other, inner end encircles a plug of insulator material which mounts the probe, which extends through the contact ring of the support. There are several advantageous features in this design. First, the way in which the probe is mounted in the insulator enables the insulator to retain the probe at a substantially pre-set degree of purchase regardless of how far the set screw is screwed into the plug, because the screw passes tangentially across the bore which receives the probe. This enables the degree of purchase to be established at a level which will permit the probe to be pulled free of the rest of the unit in the event that it becomes so snagged in underlying road or curb structure, or brush that it would risk pulling the entire unit off, and perhaps scratching the finish on the vehicle in addition to sacrificing the unit. Instead, the probe itself is pulled out, and can be cheaply replaced.

An additional safety provision lies in the fitting of the expanded feeler tip of the probe onto the end of the probe also with a pre-determined purchase, this purchase being less than the purchase of the probe within the plug of insulator such that in the event the tip is caught or snagged, it will be pulled from the unit before the probe will be pulled out, leaving the unit in functional condition. The actual snagging of the probe itself, as opposed to the expanded tip, would be a relatively remote possibility due to its smooth, straight shape.

In one embodiment, the contact surface between the ring and the probe is completely enclosed in a chamber sealed from the outside, so that in dusty areas, or in areas such as gas stations where there might be volatile fumes or mists around the switch, the contacts would not become fouled in the first instance or cause a fire or explosion in the second.

Other features and advantages will become apparent from the detailed description below.

BRIEF DESCRIPTION OF THE DRAWINGS

FIG. 1 is a side elevation view of the tubular sleeve embodiment of the unit with the protected contacts, showing the deflection of the probe in phantom;

FIG. 2 is a side elevation view of the second embodiment wherein the loop contact and its support are made from a single length of bent wire;

FIG. 3 is a side elevation view of a third embodiment, wherein the loop contact and its support are formed from sheet metal;

FIG. 4 is a section through 4—4 of FIG. 1;

FIG. 5 is a section through 5—5 of FIG. 2;

FIG. 6 is a section taken through the plug along line 6—6 of FIG. 1;

FIG. 7 is an elevation view of the embodiment of FIG. 3 as seen from the left end;

FIG. 8 is an end elevation view seen from the right end of FIG. 3; and

FIG. 9 is a schematic diagram of the sensor switch in its alarm circuit.

DETAILED DESCRIPTION OF THE PREFERRED EMBODIMENT

The environment of the system is shown in FIG. 9, wherein the switch 10 is grounded by virtue of its clamp connection to the vehicle body, with the other terminal of the switch passing through audio or visual alarm unit 12 from whence it is powered by the vehicle battery 14, such as by a stripped wire engaged between the conductive end of a fuse and a fuse housing.

The switch itself in all instances has certain mechanical features. It is held to the vehicle by a mounting bracket 16 which comprises both a clamp 18 to mount the unit on the suitable portion of a vehicle where it can ground to the frame, and also a yoke 20. The yoke is pivotally connected at 22 to the clamp preferably with a bolt so that it can be tightened down once the pivotal adjustment at this point has been made.

The top of the yoke defines a pair of apertured mounted ears 24.

Whereas the switch is indicated in FIG. 9 at 10, the three embodiments of the switch itself will be indicated at 26, 28 and 30, indicative of the embodiments of FIGS. 1, 2 and FIG. 3, it being understood that any of these switches is in the alternative switch 10 used in the circuit of FIG. 9. The switches are essentially the same except that the loop contact and the support defining the loop contact differ from one embodiment to the next.

In all embodiments, the first contact of the switch is defined by an elongated probe 32 of stainless steel or the equivalent. This probe has an expanded tip 34 at its distal end which is fitted onto the probe end with a pre-determined purchase so that it may be pulled free in the event that a snagging force great enough to damage the unit engages the tip. The probe itself is engaged at its other end in a plug 36 of insulator material such as Nylon or another tough, insulative elastomer. The probe passes through an axial bore in the plug and is detained therein by locking and contact screw 38. However, unlike most set screws, this screw does not butt into the probe, but rather passes through the plug tangentially too, but overlapping slightly, the axial bore. This is achieved by pre-drilling the set screw hole, but utilizing a self-tapping screw. As can be seen in FIGS. 6 and 7, the threads of the screw run parallel to the longitudinal dimension of the probe, and the screw hole is drilled such that the purchase between the plug and the probe can be pre-determined and set at a level somewhat higher than the purchase between the expanded tip 34 and the probe 32, for the reason stated in the summary, that is, in the case of a snag, the tip will pull off first if it is the member that is snagged, but if the entire probe is snagged somehow, it will pull free of the plug so that the remaining structure is not damaged or pulled off of the vehicle.

In the first embodiment indicated at 26 in FIG. 1, the plug is mounted in the rear end of a cylindrical sleeve 40, the forward end of which defines the second contact 42. This sleeve, made of stainless steel or chrome-plated metal, is captured in a clamp 44 which is pivotally adjustably bolted between the ears 24 as shown in FIGS. 1 and 4. Note that this adjustment, as with all the embodiments, together with the adjustment at 22 permits the probe to be mounted at any orientation, about two axes perpendicular to its longitudinal dimension.

The embodiment of FIG. 1 also utilizes a boot 46 around the second end of the support sleeve 40. This boot serves a dual function. First, it eliminates road dirt and prevents the contacts from fouling and prevents entry of flammable gas and vapors into the interior of the cylinder. Secondly, it provides a dampening function to damp out vibration of the probe, which occasionally happens under certain speed and wind conditions. The switch is grounded through its clamp, with the other contact 48 being taken off the screw 38. If the clamp is not mounted on a conductive portion of the vehicle, grounding can be achieved through a wire clipped to the vehicle frame and connected to the clamp such as by lug 49 indicated in phantom in FIG. 1. It should be noted that the set screw also makes the probe tip adjustable anywhere in three dimensions by providing the axial adjustment in combination with the other two pivotal bolt adjustments mentioned above.

The same essential structure is utilized in switch 28 illustrated in FIGS. 2 and 5, except that the second contact in support therefore is defined by a single length of wire 50, with the plug 36 press-fitted into one end. The wire defines an eyelet 52 by which the wire support is engaged in the ears 24 of the mounting bracket yoke.

Switch 30 is substantially identical to switch 28 except that rather than the support being made of wire, it is made of sheet metal, defining a pair of mounting tabs 56 for engagement on the mounting bracket.

In all of the embodiments, sensor sensitivity can be adjusted by crimping in the ring contact 42 somewhat, making it oblong, either aligned parallel to or at right angle to the principal direction of probe deflection to selectably achieve lesser or greater sensitivity respectively.

It can thus be seen that the system as shown in its three embodiments, particularly the embodiments of FIGS. 2 and 3, is reduced to its absolute simpliest form while still preserving the features of durability and damage prevention from snags. Whereas these two embodiments would rarely ever become fouled at their contacts due to the wiping action that occurs naturally between the probe and the loop contact, nevertheless under extreme conditions of mud or other caking matter, the embodiment of FIG. 1 provides an ideal, dirt-free contact situation which is also safe from fumes and vapors. In all the embodiments, the simple clamp structure would enable the clamp to be engaged in a number of locations on a normal vehicle, so that it would be effective to sense low overpasses, curbs, flat tires on a four-tire axle, or any other object in the environment.

While the preferred embodiment of the invention has been described, other modifications may be made thereto and other embodiments may be devised within the spirit of the invention and scope of the appended claims.

What is claimed is:

1. A proximity sensing and signaling device comprising:
   (a) an electrical circuit having an electrical signal device and a two-contact proximity switch therein such that where the latter is actuated, said signal device signals;
   (b) support structure for mounting said switch to a vehicle and defining a probe mount;
   (c) said proximity switch comprising:
      (i) an elongated metallic probe defining the first contact of such switch and having a foreign-object contacting, outboard end and an inboard end and being engaged in frictional sliding relation by said probe mount;
      (ii) a second contact spaced from said probe and outboard of said probe mount, and at least partially encircling said probe;
   (d) said probe mount frictionally engaging said probe and otherwise being clear of obstructions to axial motion in either direction of said probe such that said probe is axially adjustable and frictionally engageable, at adjusted positions at virtually the entire length of the probe;
   (e) said probe mount comprising a plug having said probe passing therethrough, said plug having a bore passing substantially tangentially of said probe and having a set screw therein, whereby the threads of said screw pass parallelly along said probe to engage same;
   (f) said plug being an insulator, and said screw defines part of said circuit and conducting current to said probe in addition to establishing frictional contact therein.

2. Structure according to claim 1 wherein said probe is clear of all integral lateral projections at least along its inboard portion, and said probe mount frictionally engages said probe to resist relative axial motion therebetween up to a preselected maximum level of axial pull on said probe, beyond which the probe pulls free of the remaining structure of the device such that if said probe becomes snagged on an external object, it will pull free of said probe mount when said maximum force is exceeded without damage to the remaining structure of the device.

3. A proximity sensing and signaling device comprising:
   (a) an electrical circuit having an electrical signal device and a two-contact proximity switch therein such that where the latter is actuated, said signal device signals;
   (b) support structure for mounting said switch to a vehicle and defining a probe mount;
   (c) said proximity switch comprising:
      (i) an elongated metallic probe defining the first contact of such switch and having a foreign-object contacting, outboard end and an inboard end and being engaged by said probe mount;
      (ii) a second contact spaced from said probe and outboard of said probe mount, and at least partially encircling said probe;
   (d) said probe mount being a non-conductive solid plug with a longitudinal bore therethrough with said probe inserted therein, and a lateral bore tangential to said longitudinal bore and slightly overlapping same, and including a set screw tapped in said lateral bore engaging said probe; and,
   (e) said screw having a terminal connector thereon which is wired into said circuit such that said screw doubles as an electrical contact for said probe.

* * * * *